United States Patent
Benge et al.

(10) Patent No.: US 10,282,172 B2
(45) Date of Patent: May 7, 2019

(54) AUTHORING AND DEPLOYING TELEVISION APPS AND PAGES IN A CONTENT MANAGEMENT SYSTEM

(71) Applicant: ADOBE INC., San Jose, CA (US)

(72) Inventors: David Benge, Poulsbo, WA (US); Dylan Depass, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/263,271

(22) Filed: Sep. 12, 2016

(65) Prior Publication Data

US 2018/0074795 A1 Mar. 15, 2018

(51) Int. Cl.

| | |
|---|---|
| G06F 8/34 | (2018.01) |
| G06F 8/60 | (2018.01) |
| G06F 17/22 | (2006.01) |
| H04L 29/06 | (2006.01) |
| H04L 29/08 | (2006.01) |
| H04N 21/81 | (2011.01) |
| G06F 3/0484 | (2013.01) |
| H04N 21/431 | (2011.01) |
| H04N 21/472 | (2011.01) |
| H04N 21/8543 | (2011.01) |
| H04N 21/8545 | (2011.01) |
| G06F 9/44 | (2018.01) |

(52) U.S. Cl.
CPC ............ *G06F 8/34* (2013.01); *G06F 3/04847* (2013.01); *G06F 8/60* (2013.01); *G06F 17/2247* (2013.01); *H04L 65/4084* (2013.01); *H04L 67/02* (2013.01); *H04N 21/431* (2013.01); *H04N 21/47205* (2013.01); *H04N 21/8173* (2013.01); *H04N 21/8543* (2013.01); *H04N 21/8545* (2013.01)

(58) Field of Classification Search
CPC .......... G06F 8/34; G06F 8/60; G06F 4/04847; H04N 21/8173; H04N 21/8543; H04N 21/8545
USPC ....................................................... 717/106
See application file for complete search history.

(56) References Cited

U.S. PATENT DOCUMENTS

| | | | |
|---|---|---|---|
| 6,345,292 B1 * | 2/2002 | Daugherty | G06F 17/30902 707/E17.12 |
| 6,725,421 B1 * | 4/2004 | Boucher | G06F 17/30017 348/E7.071 |
| 2003/0151621 A1 * | 8/2003 | McEvilly | H04N 7/17318 715/744 |

(Continued)

*Primary Examiner* — Ryan D. Coyer
(74) *Attorney, Agent, or Firm* — Brake Hughes Bellermann LLP (57) ABSTRACT

A content management system (CMS) for graphically authoring and deploying a television app and pages for access and display by end user devices. The CMS displays a canvas in a GUI and receives input graphically specifying page appearance using a component on the canvas. The component is compatible for rendering in a webpage format and in a television app page format. The webpage format of the component is used for rendering the component on the canvas. The CMS deploys the page so it can be rendered in either the television app page format or the webpage format depending upon which type of page is requested. The CMS can also enable authoring and deploying configuration information and application logic that is accessed by a shell app on the end user devices.

17 Claims, 8 Drawing Sheets

(56) References Cited

U.S. PATENT DOCUMENTS

| | | | |
|---|---|---|---|
| 2005/0149988 A1* | 7/2005 | Grannan | H04N 7/088 725/136 |
| 2007/0226640 A1* | 9/2007 | Holbrook | G06F 17/30864 715/765 |
| 2012/0192089 A1* | 7/2012 | Kim | G06F 17/30864 715/760 |
| 2014/0149187 A1* | 5/2014 | Farhat | G06Q 10/067 705/7.36 |
| 2015/0248423 A1* | 9/2015 | Christolini | G06F 17/3089 715/202 |
| 2015/0286737 A1* | 10/2015 | Cattone | G06F 3/04842 715/234 |

* cited by examiner

FIGURE 1

Designer Drags a Product Shelf Onto Canvas

FIGURE 2

Product Shelf Appears

FIGURE 3

Designer Drags a Product Image onto the Product Shelf

FIGURE 4

Designer Has Dragged Three Product Images onto the Product Shelf

AUTHORING AND DEPLOYING TELEVISION APPS AND PAGES IN A CONTENT MANAGEMENT SYSTEM

TECHNICAL FIELD

This disclosure relates generally to computer-implemented methods and systems and more particularly relates to improving the efficiency and effectiveness of computing methods and systems that provide apps and content on electronic devices.

BACKGROUND

Smart televisions and other devices that provide display output to televisions provide access to additional content beyond conventional broadcasted television channels. Television apps on these devices are often used to access pages that are individually downloaded using a network such as the Internet. For example, Apple TV® devices download and use television apps and pages (e.g., TVML pages) with such content. Existing techniques have significant limitations with respect to enabling the authoring and deploying of television apps and pages, such as TVML-based pages, used by television apps.

Existing systems do not sufficiently assist designers with creating, updating, and deploying pages used by television apps, and instead require writing code for the pages and/or significant backend technical work. For example, the software development kits (SDK) for Apple TV® uses JavaScript-driven templates and wraps the markup code of TVML in JavaScript. Designers must write code to use these features. Moreover, while some other systems enable GUI-based design of hyper-text-markup-language (HTML) webpages, these systems use GUIs that use HTML renderers and generate HTML code. The systems are thus unable to display, update, or deploy elements that are specific to television app page formats. For example, TVML tags for television app carousels, mockups, and overlays are not understood by HTML and the navigation elements are different.

Existing app deployment techniques also do not sufficiently assist designers with creating, updating, and deploying the television apps. Existing techniques generally require seeking approval of app updates from an app store provider and interaction on the part of the end user to affirmatively update an app. There is no coordination of updates to television apps and updates to the pages for the apps since the app updates and page updates must be deployed through different channels, e.g., the app through the app store and the pages via a content server. Moreover, when the designer deploys a new version of the app that includes updated application logic, at least some end users will fail to obtain the update since current processes require user initiated app updates. This becomes a significant issue if the designer also deploys new pages for the television app that are not compatible with the prior version of the app still being used by some end users. The existing app update techniques are also generally burdensome on the designer who must submit even minor changes for approval through the often time-consuming app store approval process.

SUMMARY

Embodiments of the invention provide a content management system (CMS) for graphically authoring and deploying a page for access and display by end user devices. The CMS displays a canvas in a graphical user interface (GUI) and receives input graphically specifying the appearance of the page using a component on the canvas. The component is compatible for rendering both in a webpage format and in a television app page format. The webpage format can be used for rendering the component on the canvas of the GUI. The CMS deploys the page so it can be rendered in either the television app page format or the webpage format. To do so, the CMS generates a page data structure defining the appearance of the page. The component is specified using both the television app page format and the webpage format so that the component can be rendered as one or the other depending on the type of page that is requested. The CMS then deploys the page for access and display by end user devices. In one example, the CMS uses a selector received in a request for the page to determine which format of the page to use in providing the page in response to the requests from television apps and web browsers.

Embodiments of the invention additionally or alternatively provide a CMS for authoring and deploying a television app for access and display by end user devices. The CMS receives input specifying a configuration of the television app and application logic of the television app. The configuration identifies the application logic of the television app and the application logic is configured to retrieve and display television app pages from the CMS. The CMS deploys the configuration of the television app, the application logic of the television app, and the television app pages for access by the end user devices. The end user devices include a shell of the television app that retrieves the app configuration of the television app from the CMS during bootstrapping. Based on the configuration identifying the application logic, the end user device retrieves the application logic of the television app from the CMS. The application logic is then executed to drive the television app and access the television app pages from the CMS.

These illustrative features are mentioned not to limit or define the disclosure, but to introduce exemplary features to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Introduction

As discussed above, existing techniques for authoring and deploying television app pages require technical sophistication and substantial manual coding effort to code and publish the content of the pages. Embodiments of the invention enable faster and easier authoring, updating, and deploying of television app pages by enabling graphical user interface (GUI)-based page design and deployment using a content management system (CMS). In some embodiments of the invention, the CMS uses multi-format components. The multi-format components include one format used during GUI-based page design and some end users and another format used by other end users. For example, some end users view the page as a webpage and other end users view the page as a television app page. Using multiple component formats enables the CMS to provide an editing canvas that uses a conventional webpage format-based renderer, such as an HTML-renderer, to display the components while also allowing the created pages to be deployed in a different, television app format, such as in the TVML format. Additionally, a single instance of page content can be designed once and used to deploy pages in the multiple formats. For example, a page can be designed and published as both an HTML-based webpage and a TVML-based television app page. Enabling the designer to design and deploy page content for different page formats in a single place makes page design easier for the designer, simplifies updating of pages that are deployed in multiple formats, and ensures consistency of content that is deployed for webpages, television apps, and other environments.

Embodiments of the invention also enable faster and easier deployment of updated versions of television apps using the content management system. Some embodiments of the invention use the CMS to create, update, and deploy a configuration and application logic of the television app that is used to render the television app pages. In addition, unlike existing television app deployment techniques that generally require seeking approval of app updates from an app store provider and interaction on the part of the end user to affirmatively update an app, the techniques of certain embodiments of the invention facilitate the updating of an app without requiring the app store approval process and/or without affirmative user action initiating the update.

Embodiments of the invention provide numerous advantages over manual techniques for designing and deploying television apps and television app pages. Designers with little or no technical sophistication can easily author television apps and page content for smart televisions and TV devices, such as Apple TV® devices, using a GUI interface with little or no coding required. Additionally, single instances of page designs, components, and assets can be used by television apps, by web browsers, and potentially additional systems. Moreover, the designer can also design and deploy the app itself without having to deploy a new app through an app store submission process.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, televisions, television set top devices, desktop computers, laptop computers, server computers, tablets, telephones, mobile telephones, portable data assistant (PDA), e-readers, smart watches, and other devices with processing capabilities that provide content for display on televisions, projectors and other displays.

As used herein, the phrases "content management system" and "CMS" refer to one or more computing devices using a computer application that supports the creation, modification, and deploying of television apps, television app pages, webpages, and/or other digital content. A CMS deploys the digital content by publishing or otherwise making the content available for access via a network. For example, a CMS may provide the digital content on one or more servers that provide the content to end users in response to requests from the end user.

As used herein, the phrase "television app" refers to any computer code (declarative and/or imperative) in one or more files designed to perform a group of coordinated functions, tasks, or activities to display digital content or provide functionality on a television. Examples of television app types include, but are not limited to, media player apps, television channel apps, shopping apps, information access apps, and other content access apps.

As used herein, the phrase "page" refers to a piece of digital content that is provided at a particular time or in response to a request. Pages include, but are not limited to, television app pages and webpages. Individual pages can be specified by code that is stored (and provided) separately from the television app's or browser's general functions and from other pages. For example, a television app may include a homepage with links to CMS addresses at which other pages of the app can be retrieved.

As used herein, the phrase "canvas" refers to a graphical container that displays the spatial relationships and appearances of various components (e.g., lines, shapes, text, frames, carousels, etc.) and assets of digital content that is being created or updated.

As used herein the phrases "graphical user interface" and "GUI" refer to a user interface provided by a computing device that allows users to interact through graphical icons, images, and elements rather than using only text to interact with the user interface.

As used herein, the phrase "component" refers to any feature or template that can be included in a page to present one or more assets and/or provide functionality. Example components include, but are not limited to, carousel, chart, column, checked password field, comments, download (for making a file available for download), external (for embedding external apps), flash (for entering an Adobe® Flash® movie, form, account name, address field, captcha, checkbox group, dropdown list, end (for end of a form), file upload, hidden field, image button, image upload, link field, password field, password reset, radio group, submit button, tags field, text field, forum, forum search, forum topic, forum post, image, inheritance paragraph system, list, logo, paragraph system, parbase, product list, profile avatar photo, profile detailed name, profile e-mail, profile gender, profile text property, profile primary phone number, profile primary URL, ratings, reference, search, sitemap, slideshow, table, tag cloud, teaser, text, text image, title, toolbar, topnav, trail, user state toggle button, and video components.

As used herein, the phrase "assets" refers to any image, text, or other element that provides digital content that can be displayed in a page or functionality that can be provided by the page.

As used herein, the phrase "television app page format" refers to any format of a page that can be rendered by a television app on a television or other electronic device that provides content to a television. TVML is an example of a television app page format.

As used herein, the phrase "webpage format" refers to any format of a page that can be rendered by a web browser. HTML and XML are examples of webpage formats.

As used herein, the phrase "selector" refers to a portion of a URL used to request a page. If the first character in the request URL after the resource path is a dot, the string after the dot up to but not including the last dot before the next slash character or the end of the request URL is the selector.

As used herein, the phrase "bootstrapping" refers to a process of software, such as a television app, starting through a chain of stages in which a smaller program loads and then executes a larger, more complicated program of the next stage, and so on.

Figure 1:
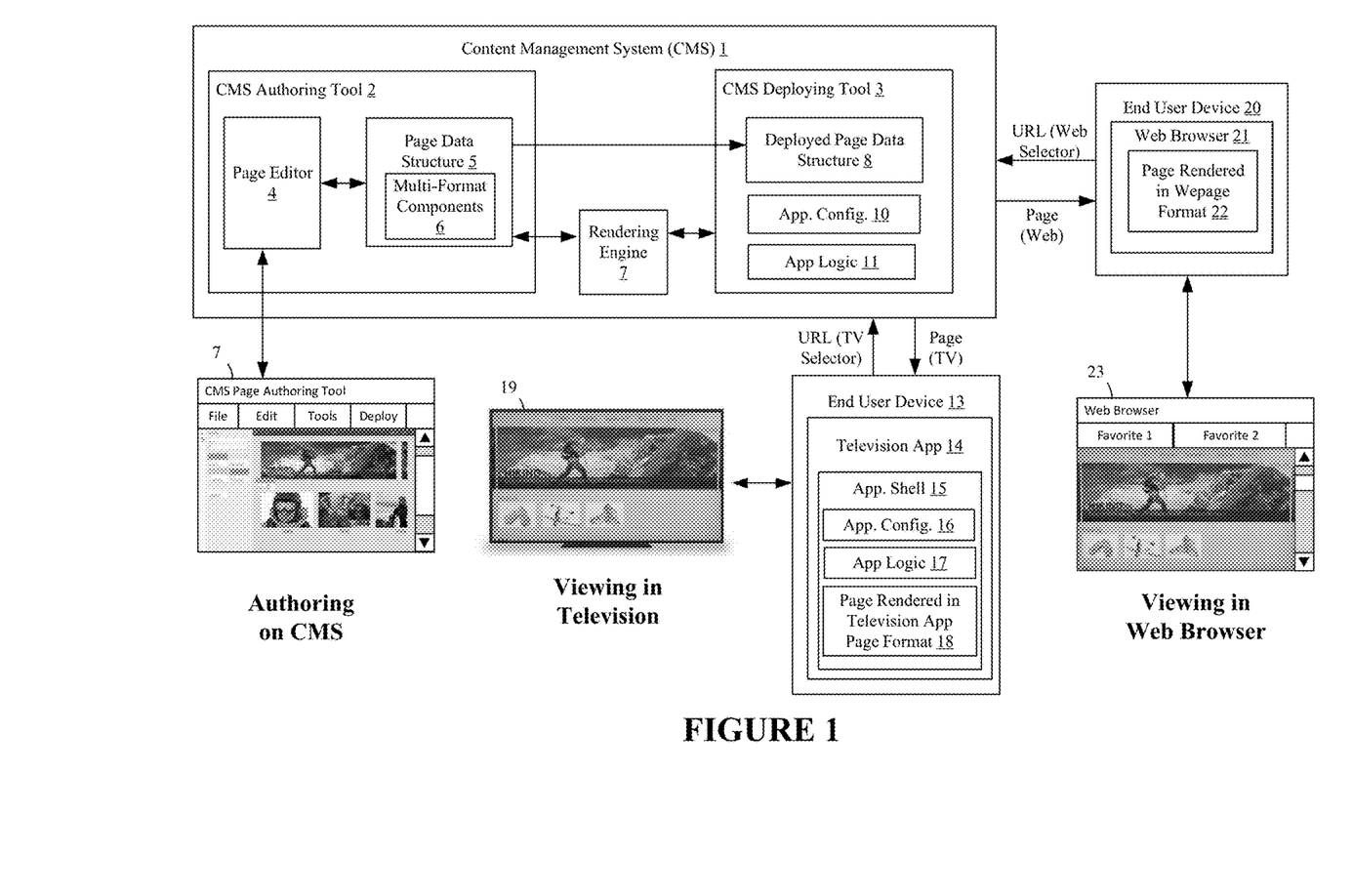
FIG. 1 is a block diagram illustrating an exemplary CMS for authoring and deploying television apps and pages to end users.

Exemplary CMS for Authoring and Deploying Television Apps and Pages to End Users FIG. 1 is a block diagram illustrating an exemplary CMS 1 for authoring and deploying television apps and pages to end users using such components. The CMS 1 includes a CMS authoring tool 2 for authoring television apps and pages, a CMS deploying tool 3 for publishing television apps and pages (both television app pages and webpages), and a rendering engine 6 for rendering page content.

The CMS authoring tool 2 includes a page editor 4 that provides an interface for creating and changing the location and size of components on a page and specifying content that will be displayed. In this example, the page editor 4 provides a graphical user interface (GUI) editing canvas in which a user positions graphical items as illustrated in the illustrated GUI 7, and the page editor represents the page in a page data structure 5 that includes multi-format components 6.

The page data structure 5 in this example is a hierarchy of nodes that can have sub-nodes and attributes specified. For example, a home page will have several content nodes and metadata defining what the nodes will display and how each node and its content will be displayed. In one specific example, a home page data structure includes a carousel component and a category shelf component, each of which includes data attributes that specify the size and display location of the component as well one or more the file storage location of content images, text, or other items that each component will display. The designer uses the GUI interface 7 to add, remove, and modify components. For example, the designer can place an image component at a location on the canvas, size the image component to a desired size, and then assign an image asset to provide the appearance of the image. When a designer drags a component onto a page, a node is created in the data structure 5, along with data specifying the size, shape, and display location of the component. When the designer, then identifies an image that will be displayed in the component, for example by dragging the image onto the component, the data structure 5 is changed by adding metadata for the component specifying the file storage location of the image to be displayed by the component. In this way, the page editor 4 creates and edits the page data structure 5 as the designer creates and edits the page.

Nodes of the page data structure 5 include resource type attributes that tell a rendering engine 7 how to render the node. In one embodiment, selectors are used when requesting to render a page and the rendering engine 7 selects how to render the node based on the selector. For example, if a TVML selector is used, the rendering engine 7 renders a TVML version of the page, if an HTML (or default) selector is used, then the rendering engine renders and HTML version of the page. The resource type attribute of a node point to a particular path (e.g., director) in a data repository in one embodiment of the invention. For example, based on receiving a request that uses a TVML selector, a rendering engine 7 identifies that the resource type is pointing to a particular path in the repository, goes to that path and finds data objects and scripts specific to rendering the node as part of a TVML page. The rendering engine 7 is thus able to render different views of the page based on the type of the request for the page. In one embodiment of the invention, the page editor 4 requests a particular view of the page to render the page on the GUI. For example, the page editor 4 may request an HTML view of the page to use in the GUI.

Figure 3:
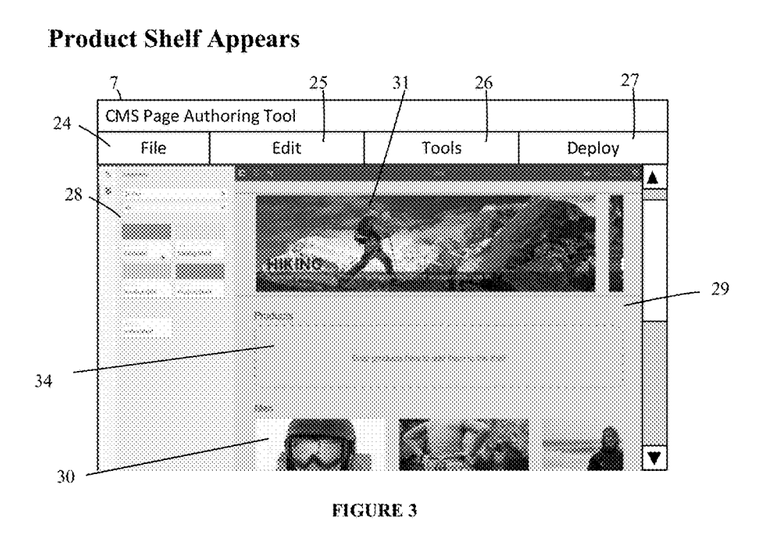
FIG. 3 is a screen shot of the GUI of FIG. 2 with a placeholder for the product shelf component displayed.

When the designer selects to deploy the page, the data structure 5 is provided to the CMS deploying tool 3 and is illustrated in FIG. 3 as deployed page data structure 8. It is not necessary to make a separate copy of the page data structure 5 to deploy the page. The CMS deploying tool 3 also includes a television app configuration 10, and television app logic 11. These features of the CMS deploying tool 3 make the television app and the deployed page available to end use devices 13, 20.

End user device 13 is a computing device, such as an Apple TV® configured to provide digital content on a television 19. The end user device 13 includes a television app 14 with features that are added to the end user device 13 at different times. For example, app shell 15 is added to the end user device 13 when the end user selects to add television app to the device using an app store. When the television app shell 15 is launched on the end user device 13, the app shell 15 downloads the television application configuration 10 from the CMS 1 and stores it as television app configuration 16 on the end user device 13. The television app configuration 16 identifies the television app logic 11, which is then downloaded and stored as television app logic 17 on the end user device 13. The television app configuration 16 also provides a default view of the app and, as the television app is used, one or more pages are accessed and displayed. When a given page is accessed, the television app logic 17 identifies a network location of the page to download from the CMS 1 and requests the page. In this example, the end user device 13 sends a request to the CMS 1 that includes a URL of the page with a TVML selector in the request. As a result, the CMS 1 renders the television app page in a TVML format to be displayed on television 19. For example, rendering engine 7 can interpret the selector provided with the request and access the deployed page data structure to generate a TVML formatted file on the fly and send it to the end user device 13.

End user device 20 is a computing device with a web browser 21. The web browser sends a request for the page using a URL of the page with a selector for the webpage format of the page to the CMS 1. As a result, the CMS 1 provides the page in the webpage format, which is stored as the page in the webpage format 22 on the end user device 20 and displayed on a monitor 23 within a browsing interface of the web browser.

Thus, FIG. 1 illustrates how, in some embodiments of the invention, the deploying page using the different formats of the components 6 is enabled using selectors (e.g., .html. And .tvml.), which are used by the requesting system to tell the CMS 1 which version of the pages to provide. As a specific example, a designer can create a page (page1) and deploy the page in both HTML and TVML. A web browser 21 will request page1.html.com and receive an HTML version of the page and an end user device 13, such as an Apple TV®, will request page1.tvml.com and receive a TVML version of the page. The CMS rendering engine 7 includes logic to parse a URL in a request for a page, identify a format based on a selector of the URL, and render an appropriate page based on the selector of the URL in response to the request for the page.

TVML and HTML use different syntax for user interface elements. Special tags may be used in the television app page format for navigation in the circumstance where the television app page format does not use tags that corresponds to the web browser tags (e.g., anchor tags). The special navigation tags can be configured to link content to actions performed by using actions in the load function in the television app logic.

Figure 2:
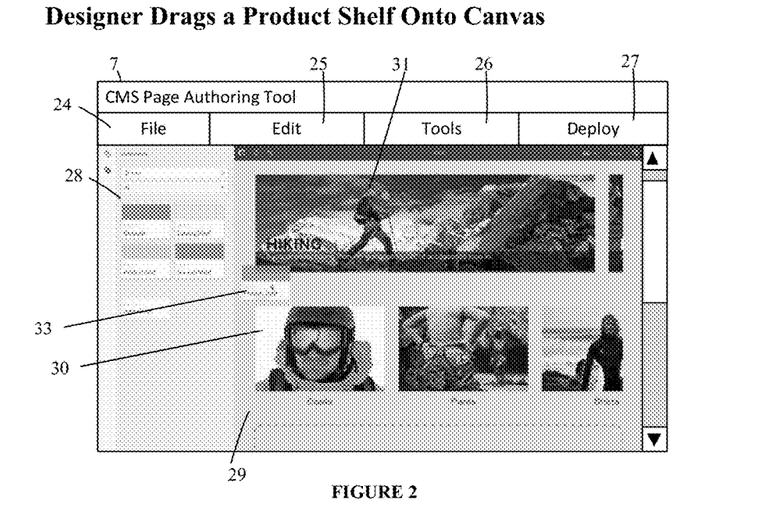
FIG. 2 is a screen shot of a GUI for graphically authoring a page in which the designer drags a dual format product shelf component onto the canvas.
Figure 4:
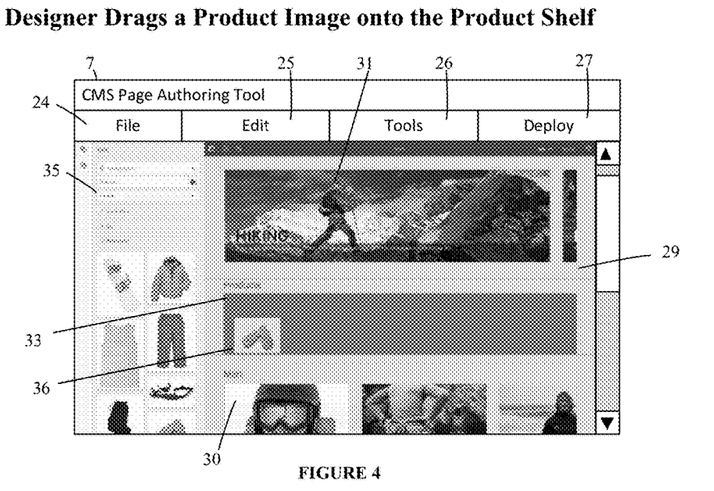
FIG. 4 is a screen shot of the GUI of FIG. 2 in which the designer drags an image to be included on the product shelf component.
Figure 5:
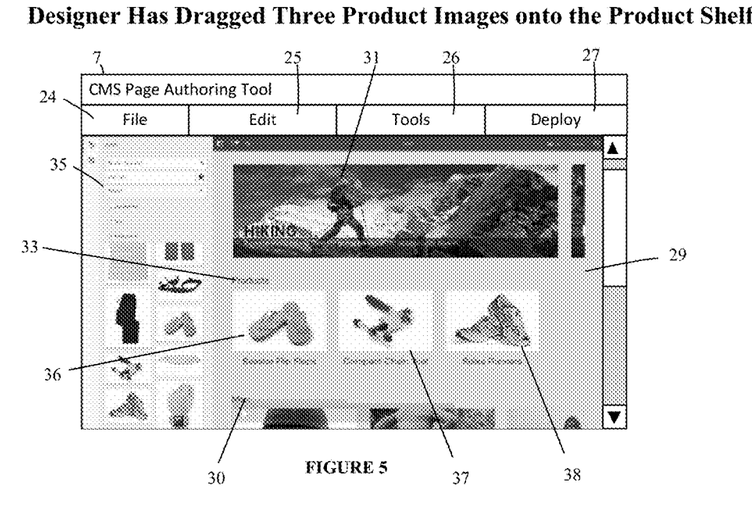
FIG. 5 is a screen shot of the GUI of FIG. 2 with three image assets included on the product shelf component.

FIGS. 2-5 illustrate authoring a page using a multi-format component on a canvas of a GUI of a CMS. FIG. 2 is a screen shot of a GUI 7 for graphically authoring a page. The GUI 7 includes a menu bar with menus 24, 25, 26, 27 providing access to GUI editing tools. The GUI 7 also includes a components menu 28 for selecting components to add to the canvas 29. The canvas 29 displays the appearance of a page that is being created and includes an image component 31 with an image and a carousel component 30 with several images. FIG. 2 illustrates a designer dragging a product shelf component 33 from the components menu 28 onto the canvas to add it to the page appearance at a particular location that is identified by the drag and drop input. FIG. 3 is a screen shot of the GUI of FIG. 2 with a placeholder 34 for the product shelf component 33 displayed after the designer has dragged and dropped the it onto the canvas 29. FIG. 4 is a screen shot of the GUI of FIGS. 2 and 3 in which the designer drags an image 36 from an assets menu 35 to be included on the product shelf component 33. FIG. 5 is a screen shot of the GUI of FIG. 2-4 with three images 36, 37, 38 from the assets menu 35 included on the product shelf component 33.

Figure 6:
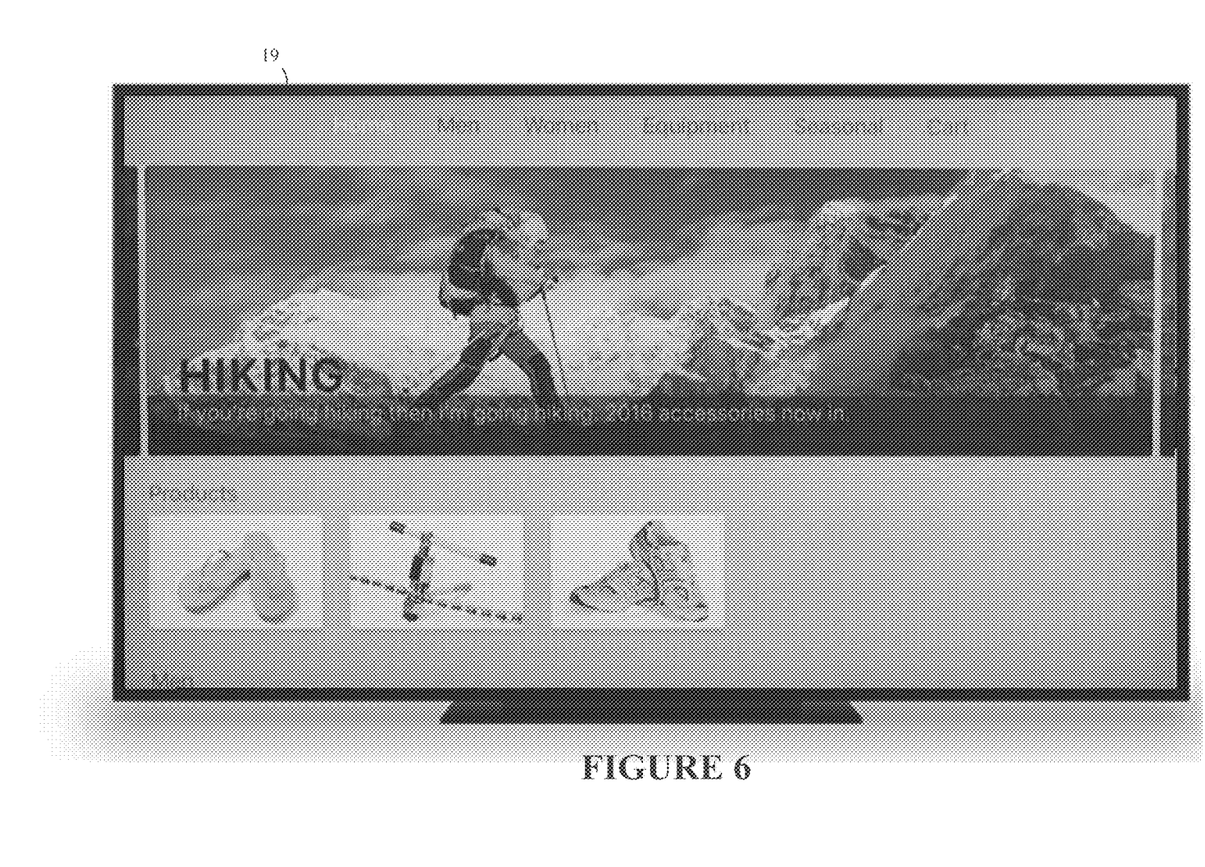
FIG. 6 is front view of a television displaying a deployed television app page that was designed using the GUI of FIGS. 2-5.

FIG. 6 is front view of a television 19 displaying a deployed television app page designed using the GUI of FIGS. 2-5. The GUI of FIGS. 2-5 includes an option that the designer selects to deploy the page. If a prior version of the page is already deployed, then a new version of the page is deployed in place of the prior version. In addition, the page may be deployed in multiple formats, which may be selected by the designer using the GUI.

Figure 7:
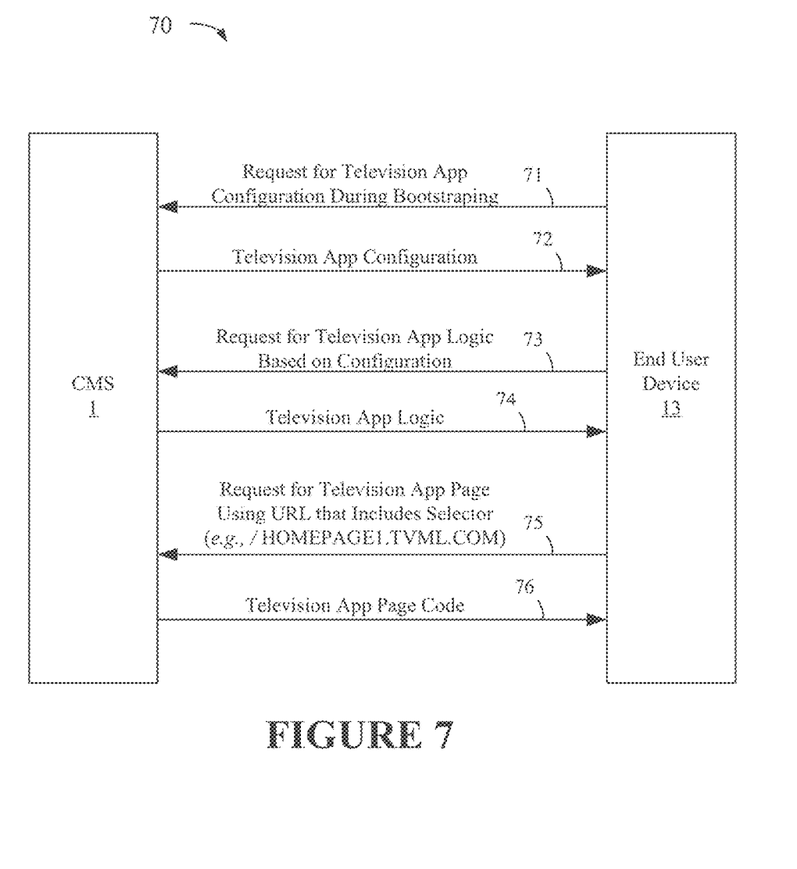
FIG. 7 is a flow chart illustrating an exemplary series of communications used by an end user device to access a television app and page from a CMS.

FIG. 7 is a flow chart illustrating an exemplary series of communications 70 used by an end user device 13 to access a television app and page from a CMS 1. In this example, the end user device 13 sends a request 71 for the television app configuration during bootstrapping. For example, the end user device can include a shell app that sends request 71 when it is launched by the end user. The CMS responds to request 71 by sending a message 72 with the television app configuration. The end user device 13 continues to load the television app and uses the television app configuration that was received to identify the location at the CMS 1 of the television app logic and sends request 73 for that television app logic. The CMS 1 responds by sending the television app logic 74 to the end user device 13. The end user device 13 uses the television app logic to drive the television app and determines one or more pages to retrieve and display on the television. In one example, a default view or page is defined by the television app configuration and fetched by the application logic. The end user device 13 sends a request 75 for the television app page using a URL that includes a selector that identifies which format of the page is being requested (e.g., /HOMEPAGE1.TVML.COM). The CMS responds to the request 75 by sending the television app page code in message 76 and end user device displays the television app and homepage. When the end user selects a link on the homepage to access another page, the end user device sends another page request that uses URL with television app page selector to retrieve that page, and so on.

Figure 8:
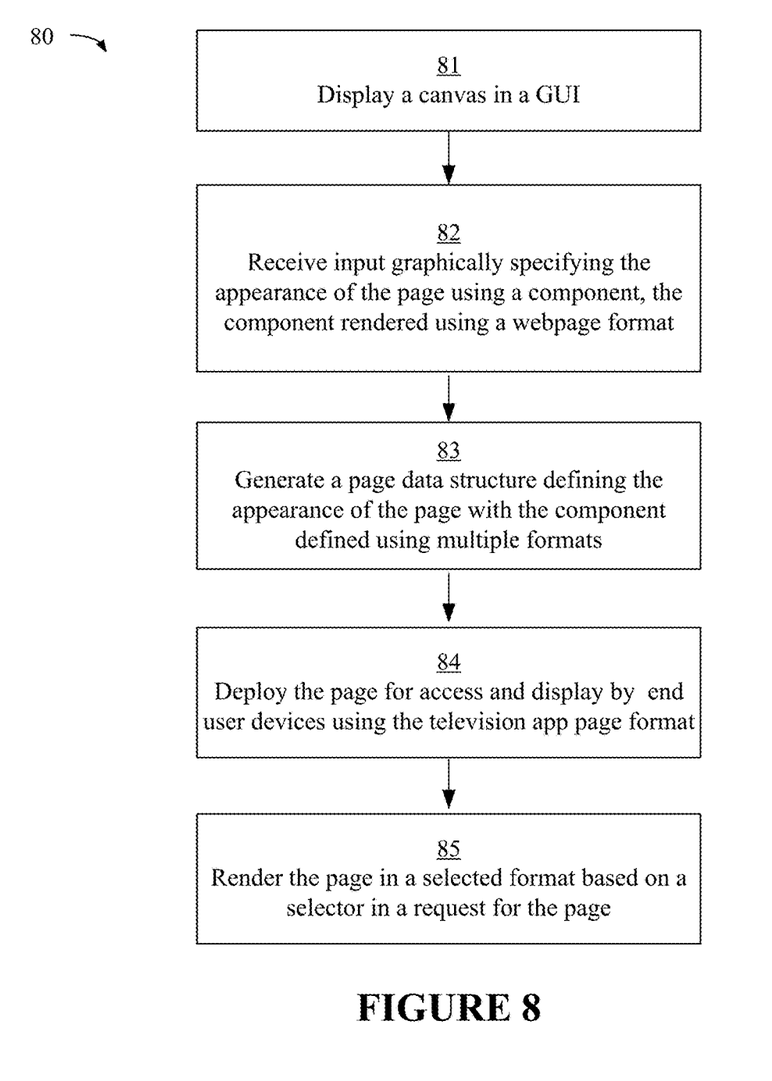
FIG. 8 is a flow chart illustrating an exemplary method for using a CMS to graphically author and deploy a page for access and display by end user devices.

FIG. 8 is a flow chart illustrating an exemplary method for using a CMS to graphically author and deploy a page for access and display by end user devices using a television app. Method 80 can, for example, be performed on the CMS 1 illustrated in FIG. 1 or on any other suitable computing device.

Method 80 displays a canvas in a GUI for graphically authoring an appearance of the page, as shown in block 81. Method 80 receives input graphically specifying the appearance of the page using a component on the canvas, as shown in block 82. The component is rendered on the canvas using the webpage format. In one embodiment of the invention, the webpage format is HTML and an HTML renderer renders the component on the canvas of the GUI. The component is compatible for rendering in a webpage format and in a television app page format. In one embodiment of the invention, the television app page format is TVML.

In one embodiment of the invention, the CMS includes multiple predefined components compatible for rendering in the webpage format and in the television app page format. For example, an image component is predefined to allow an input-specified image asset to be added to the appearance of the page. A carousel component is predefined to allow multiple assets in a horizontal row or vertical column to be added to the appearance of the page. Components can be used to provide functionality and/or interactivity on the page and use different tags to specify the functions and/or interactivity for the webpage format and the television app page format.

Method 80 further involves creating or modifying a page data structure defining the appearance of the page with the component defined using multiple formats, as shown in block 83. For example, the nodes of the data structure include resource type attributes specifying how each node will be rendered based on the type specified by a request. The method 80 further involves deploying the page for access and display by the end user devices using the multiple formats, as shown in block 84. For example, the data structure for the page can be stored on one or more servers that are accessible using a public network such as the Internet.

Method 80 further involves rendering the page in a selected format based on a selector in a request for the page, as shown in block 85. In one embodiment of the invention, the CMS uses a selector received in a request for the page to determine a page format to use in rendering the page in response to the request. For example, requests for the page from web browsers may use a URL that includes a first selector used by the CMS to determine to render the page in response to the request using a webpage format and requests for the page from television apps may use another URL that includes a second selector different from the first selector that is used by the CMS to determine to render the page in response to the request using a TVML format.

Figure 9:
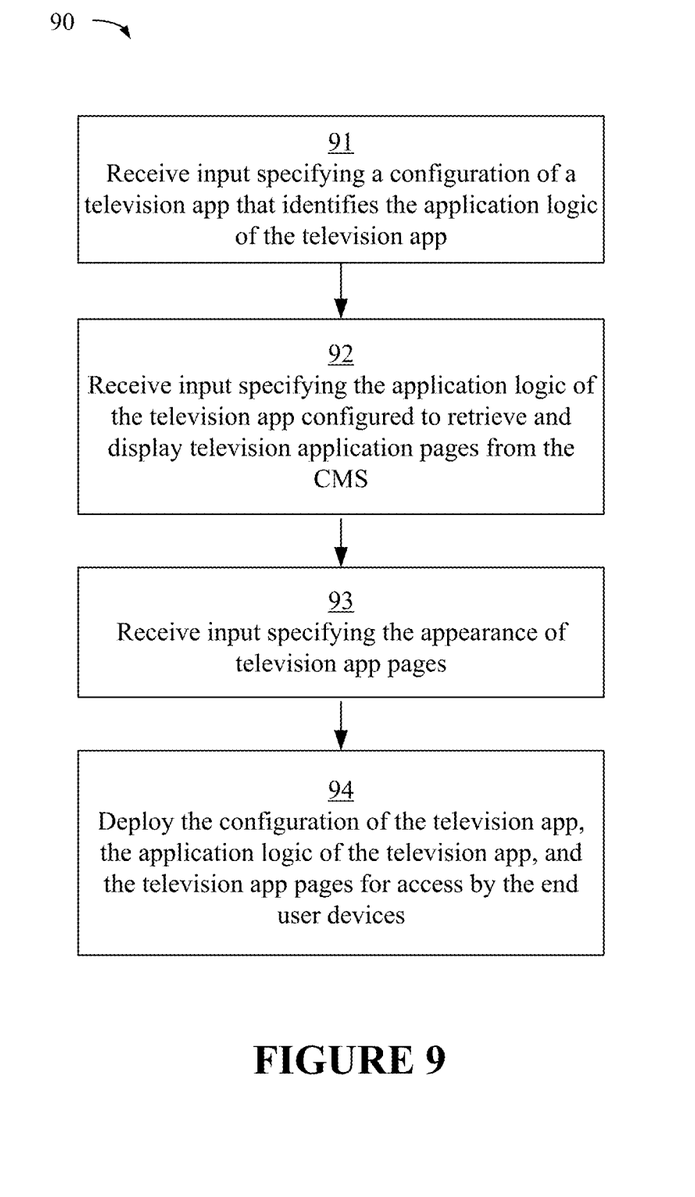
FIG. 9 is a flow chart illustrating an exemplary method for using a CMS to author and deploy a television app for access and display by end user devices.

FIG. 9 is a flow chart illustrating an exemplary method 90 for using a CMS to author and deploy a television app for access and display by end user devices. Method 90 can, for example, be performed on the CMS 1 illustrated in FIG. 1 or on any other suitable computing device.

Method 90 involves receiving input specifying a configuration of the television app, as shown in block 91. The configuration identifies the application logic of the television app. Method 90 further involves receiving input specifying the application logic of the television app, as shown in block 92. The application logic is configured to retrieve and display television app pages from the CMS. In one embodiment of the invention, the application logic of the television app is further configured to provide features of the television app that are generic to the pages of the television app. Method 90 further involves receiving input specifying the appearance of television app pages, as shown in block 93.

Method 90 deploys the configuration of the television app, the application logic of the television app, and the television app pages for access by the end user devices, as shown in block 94. The end user devices include a shell of the television app that retrieves the app configuration of the television app from the CMS during bootstrapping, retrieves the application logic of the television app based on the configuration, and retrieves the television app pages by default and/or based on the end user interacting with page links on the television app pages.

Using methods 80 and 90, a designer can graphically design, deploy, and update a television app and its pages without having to deploy a new app through an app store submission process and without having to worry about incompatibilities and end users not updating their apps with new versions.

Exemplary Computing Environment

Figure 10:
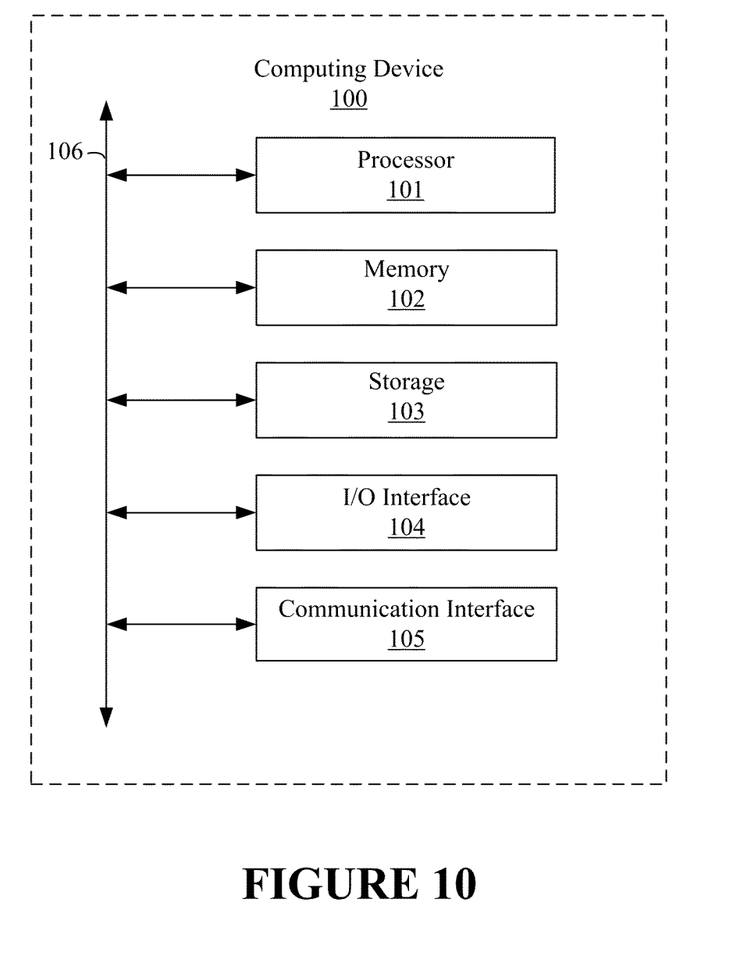
FIG. 10 is a block diagram depicting an example hardware implementation.

Any suitable computing system or group of computing systems can be used to implement the techniques and methods disclosed herein. For example, FIG. 10 is a block diagram depicting examples of implementations of such components. The computing device 100 can include a processor 101 that is communicatively coupled to a memory 102 and that executes computer-executable program code and/or accesses information stored in memory 102 or storage 103. The processor 101 may comprise a microprocessor, an application-specific integrated circuit ("ASIC"), a state machine, or other processing device. The processor 101 can include one processing device or more than one processing device. Such a processor can include or may be in communication with a computer-readable medium storing instructions that, when executed by the processor 101, cause the processor to perform the operations described herein.

The memory 102 and storage 103 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 100 may also comprise a number of external or internal devices such as input or output devices. For example, the computing device is shown with an input/output ("I/O") interface 104 that can receive input from input devices or provide output to output devices. A communication interface 105 may also be included in the computing device 100 and can include any device or group of devices suitable for establishing a wired or wireless data connection to one or more data networks. Non-limiting examples of the communication interface 105 include an Ethernet network adapter, a modem, and/or the like. The computing device 100 can transmit messages as electronic or optical signals via the communication interface 105. A bus 106 can also be included to communicatively couple one or more components of the computing device 100.

The computing device 100 can execute program code that configures the processor 101 to perform one or more of the operations described above. The program code can include one or more modules. The program code may be resident in the memory 102, storage 103, or any suitable computer-readable medium and may be executed by the processor 101 or any other suitable processor. In some embodiments, modules can be resident in the memory 102. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for using a content management system (CMS) to graphically author and deploy a page for access and display by end user devices using a television app, the method comprising the CMS:
   displaying a canvas in a graphical user interface (GUI) for graphically authoring a single instance of an appearance of a page;
   receiving input graphically specifying the single instance of the appearance of the page using a component on the canvas, wherein:
      the component is graphically authored and rendered on the canvas using a webpage format language, and
      the component is compatible for rendering on end user devices in the webpage format language and in a television app page format language;
   generating a page data structure defining the single instance of the appearance of the page, wherein the component is specified using alternative format languages, the alternative format languages comprising the television app page format language and the webpage format language;
   deploying the page for access and display by the end user devices;
   in response to requests to render the page from web browsers, rendering the page including the component using the webpage format language; and
   in response to requests to render the page from television apps, rendering the page including the component using the television app page format language.

2. The method of claim 1, further comprising the CMS using a selector received in a request for the page to determine a page format to use in providing the page in response to the request.

3. The method of claim 2, wherein:
   requests for the page from web browsers use a uniform resource locator (URL) that includes a first selector used by the CMS to determine to provide the page in response to the request using the webpage format language; and
   requests for the page from television apps use another URL that includes a second selector different from the first selector, the second selector used by the CMS to determine to provide the page in response to the request using the television app page format language.

4. The method of claim 1, wherein the webpage format language is a hyper-text-markup language (HTML) format used by an HTML renderer to render the component on the canvas of the GUI.

5. The method of claim 1, wherein the television app page format language is a television markup language (TVML) format used by a renderer to render the component as part of a television app on a television.

6. The method of claim 1, wherein the CMS includes multiple predefined components compatible for rendering in the webpage format language and in the television app page format language.

7. The method of claim 1, wherein the component is an image component that adds an input-specified image to the single instance of the appearance of the page.

8. The method of claim 1, wherein the component is a carousel component that displays multiple element in a horizontal row or vertical column in the single instance of the appearance of the page.

9. The method of claim 1, wherein the component provides interactivity on the page, wherein the component uses different tags to specify the interactivity for the webpage format language and the television app page format language.

10. The method of claim 1 further comprising the CMS:
   receiving additional input graphically specifying an updated single instance of an appearance of the page;
   generating an updated page data structure defining the updated single instance of the appearance of the page; and
   deploying the updated page data structure, wherein a rendering engine responds to requests for the page to provide a requested format of the page by rendering the page data structure into a file having the requested format on the fly.

11. The method of claim 1, further comprising the CMS:
   receiving input specifying a configuration of the television app; and
   deploying the configuration of the television app for access by the end user devices using the television app, wherein the end user devices include a shell of the television app that retrieves the app configuration of the television app from the CMS during bootstrapping of the television app.

12. The method of claim 1, further comprising the CMS:
   receiving input specifying application logic of the television app; and
   deploying the application logic of the television app for access by the end user devices using the television app, wherein the end user devices retrieve the application logic of the television app from the CMS.

13. The method of claim 1, further comprising the CMS:
   receiving input specifying a configuration of the television app;
   receiving input specifying application logic of the television app; and
   deploying the configuration and application logic of the television app for access by the end user devices using the television app, wherein the end user devices include a shell of the television app that retrieves the app configuration of the television app from the CMS during bootstrapping of the television app and then retrieve the application logic of the television app from the CMS.

14. A method for using a content management system (CMS) to author and deploy a television app for access and display by end user devices, the method comprising the CMS:
- receiving input specifying a configuration of a television app, the configuration identifying a location at a content management system (CMS) of application logic of the television app;
- receiving input at the location at the CMS requesting the application logic of the television app, the application logic configured to retrieve and display television app pages from the CMS;
- deploying the configuration of the television app, the application logic of the television app, and the television app pages for access by end user devices, wherein the end user devices include a shell of the television app that retrieves the configuration of the television app from the CMS during bootstrapping, wherein the application logic of the television app is retrieved based on the configuration;
- receiving input updating the application logic of the television app and input updating the television app pages; and
- deploying the updated application logic and the updated television app pages at approximately a same time independent of affirmative user action to initiate the deployment.

15. The method of claim 14, wherein the application logic of the television app is further configured to provide features of the television app that are generic to the pages of the television app.

16. A content management system (CMS) for graphically authoring and deploying a page for access and display by end user devices using a television app, the CMS comprising:
- a processor; and
- a non-transitory computer readable medium comprising instructions, wherein, when the instructions are executed by the processor, the processor preforms operations comprising:
  - displaying a canvas in a graphical user interface (GUI) for graphically authoring a single instance of an appearance of a page;
  - receiving input graphically specifying the single instance of the appearance of the page using a component on the canvas, wherein:
    - the component is graphically authored and rendered on the canvas using a webpage format language, and
    - the component is compatible for rendering on end user devices in the webpage format language and in a television app page format language;
  - generating a page data structure defining the single instance of the appearance of the page, wherein the component is specified using alternative format languages, the alternative format languages comprising the television app page format language and the webpage format language;
  - deploying the page for access and display by the end user devices;
  - in response to requests to render the page from web browsers, rendering the page including the component using the webpage format language; and
  - in response to requests to render the page from television apps, rendering the page including the component using the television app page format language.

17. The system of claim 16, wherein the operations further comprise using a selector received in a request for the page to determine a page format to use in providing the page in response to the request.

* * * * *